United States Patent [19]

Kaesser

[11] Patent Number: 5,646,856
[45] Date of Patent: Jul. 8, 1997

[54] VEHICLE NAVIGATION SYSTEM

[76] Inventor: Juergen Kaesser, Ahornweg 5, D-3201 Diekholzen 2, Germany

[21] Appl. No.: 761,846

[22] PCT Filed: Jun. 8, 1989

[86] PCT No.: PCT/EP89/00646

§ 371 Date: Sep. 26, 1991

§ 102(e) Date: Sep. 26, 1991

[87] PCT Pub. No.: WO90/15307

PCT Pub. Date: Dec. 13, 1990

[51] Int. Cl.[6] ............................................. G06G 7/78
[52] U.S. Cl. ........................... 364/449.4; 364/449.3; 364/449.2; 364/449.5; 364/457; 340/995; 340/990; 340/988; 73/178 R
[58] Field of Search ........................... 364/449, 709.01, 364/709.11, 444, 443, 449.1, 449.2, 449.3, 449.4, 449.5, 449.6, 444.2, 449.8, 447, 457, 458; 340/707, 995, 990, 988, 932.2; 73/178 R

[56] References Cited

U.S. PATENT DOCUMENTS

| 4,570,227 | 2/1986 | Tachi et al. | 364/444.2 |
| 4,882,696 | 11/1989 | Nimura et al. | 364/449.5 |
| 4,888,699 | 12/1989 | Knoll et al. | 364/449.3 |
| 4,926,336 | 5/1990 | Yamada | 364/444.2 |
| 4,937,751 | 6/1990 | Nimura et al. | 364/449.5 |
| 4,989,151 | 1/1991 | Nuimura | 364/449.1 |
| 5,043,902 | 8/1991 | Yokoyama et al. | 364/449.5 |
| 5,046,011 | 9/1991 | Kakihara et al. | 364/449.3 |
| 5,059,965 | 10/1991 | Geiser | 340/995 |
| 5,103,400 | 4/1992 | Yamada et al. | 364/444.2 |
| 5,115,399 | 5/1992 | Nimura et al. | 364/449.2 |
| 5,121,326 | 6/1992 | Moroto et al. | 364/449.6 |

*Primary Examiner*—Jacques Louis-Jacques
*Attorney, Agent, or Firm*—Michael J. Striker

[57] ABSTRACT

A vehicle navigation system for a vehicle operable by an operator includes a memory for storing data representing a road map including roads and their junctions over which the vehicle can travel as well as a number of available routes over the roads; a display and processing device for some of the data; a light pen device for following map data displayed on the display device to selected a desired route for vehicle travel, not necessarily one of the stored available routes; an input device for storing the desired route selected by operation of the light pen device; a correlation device for comparing the desired route stored in the input device with the available routes in memory to find a selected route which is closest to the desired route; an additional memory for storing the selected route connected to the correlation device; and a control unit connected to the additional memory for displaying and/or communicating the selected route to the operator.

6 Claims, 2 Drawing Sheets

VEHICLE NAVIGATION SYSTEM

BACKGROUND OF THE INVENTION

The present invention relates to navigation systems, and is particularly applicable to navigation systems for land vehicles. Navigation systems for use in shipping, air and space travel are well known and their benefit is indisputable. More recently, navigation systems for overland travel have met with increasing interest and homing systems for travel on motorways and city road systems have been proposed.

An electronic traffic pilot for motorists is described in an article in the German magazine "Funknavigation", issue No. 4 of 1983, entitled EVA-Ortungs-und Navigations system fur Landfahrzeuge, by Ernst P. Neukirchner, Otmar Pilsak, and Dietmar Schlogl. The basic system includes a driver communication system in which the starting point and the desired destination are entered, and direction recommendations issued; a route search system, which computes the optimum route, based on the starting point and destination entered, by accessing a digital illustration of the road system; a locating system which continuously updates the actual position during the journey and a navigation system, which makes a comparison of the set route and the actual route and, in the event of any disparity, causes the route search system to determine a new optimum route from the actual position. This last feature makes the homing always optimal, regardless of whether or not the directional recommendations are followed.

The known system requires a very large data handling capability and is hence complex and expensive to produce. Using this system the driver simply has to enter his desired destination and the navigation system will guide him there, for example using commands output in synthetic language. Thus, this system requires the minimum of activity on the part of the driver. However, a simpler system would be desirable from the standpoint of cost and large-scale production.

SUMMARY OF THE INVENTION

It is an object of the present invention to provide an improved vehicle navigation system, especially for a motor vehicle, which is simpler and less complex than the prior art systems.

The present invention provides a vehicle navigation system including means for storing data representing a route to be followed; means for detecting an actual position of and the actual path travelled by the vehicle; comparison means for comparing the actual position of the vehicle to the route to be followed; and means responsive to said comparison means for giving direction commands to the vehicle operator; and particularly manually operable means for inputting data representing a desired route. By obeying the direction commands the operator is able to steer the vehicle along the selected route. Thus, the present invention provides a navigation system which does not require a route search algorithm or an extended database and is hence less complex and less expensive to produce.

The present invention is applicable to navigation systems in general and the term "vehicle" used herein is intended to include ships and aircraft as well as land vehicles.

The invention has considerable advantages for a driver of a vehicle since, once the selected route has been stored in the system, the driver does not have to memorize the route or refer to a map. His or her mind is free to concentrate on driving the vehicle.

In contrast to the known vehicle navigation system the driver inputs his or her own desired route which determines the selected available route, rather than relying on a route entirely determined by the system itself from the starting point and destination. For many drivers this is in any case preferable.

The means for giving direction commands to the vehicle operator may simply comprise a visual display, mounted on a car dashboard for example, showing the selected route and also indicating the actual position of the vehicle. The driver can then see at a glance whereabouts the vehicle is on the selected route and determine which direction should be followed next. The system may additionally include means for commanding the driver in synthesized speech to ensure that in a road system he does not miss any turns.

The means for inputting the selected route may comprise a light pen which may be used to trace the selected route on a display screen. Alternatively for a car travelling through a road network the route to be travelled may be input using the digitizing mesh system used in the known EVA navigation system.

The system preferably includes means for storing data representing available routes, i.e. a road map storage device. For example, a navigation system for a land vehicle such as a car may include details of the road network for the area through which a journey is to be made. Such a system may also include means for eliminating discrepancies between the input desired route and the available routes. To this end, a correlator may be provided for selecting from the available routes that which corresponds most closely to the desired route input by the operator. The visual display may include a cathode ray tube or a liquid crystal display.

BRIEF DESCRIPTION OF THE DRAWING

An embodiment of the invention will now be described by way of example only and with reference to the accompanying drawings in which.

DETAILED DESCRIPTION OF THE PREFERRED EMBODIMENTS

Figure 1:
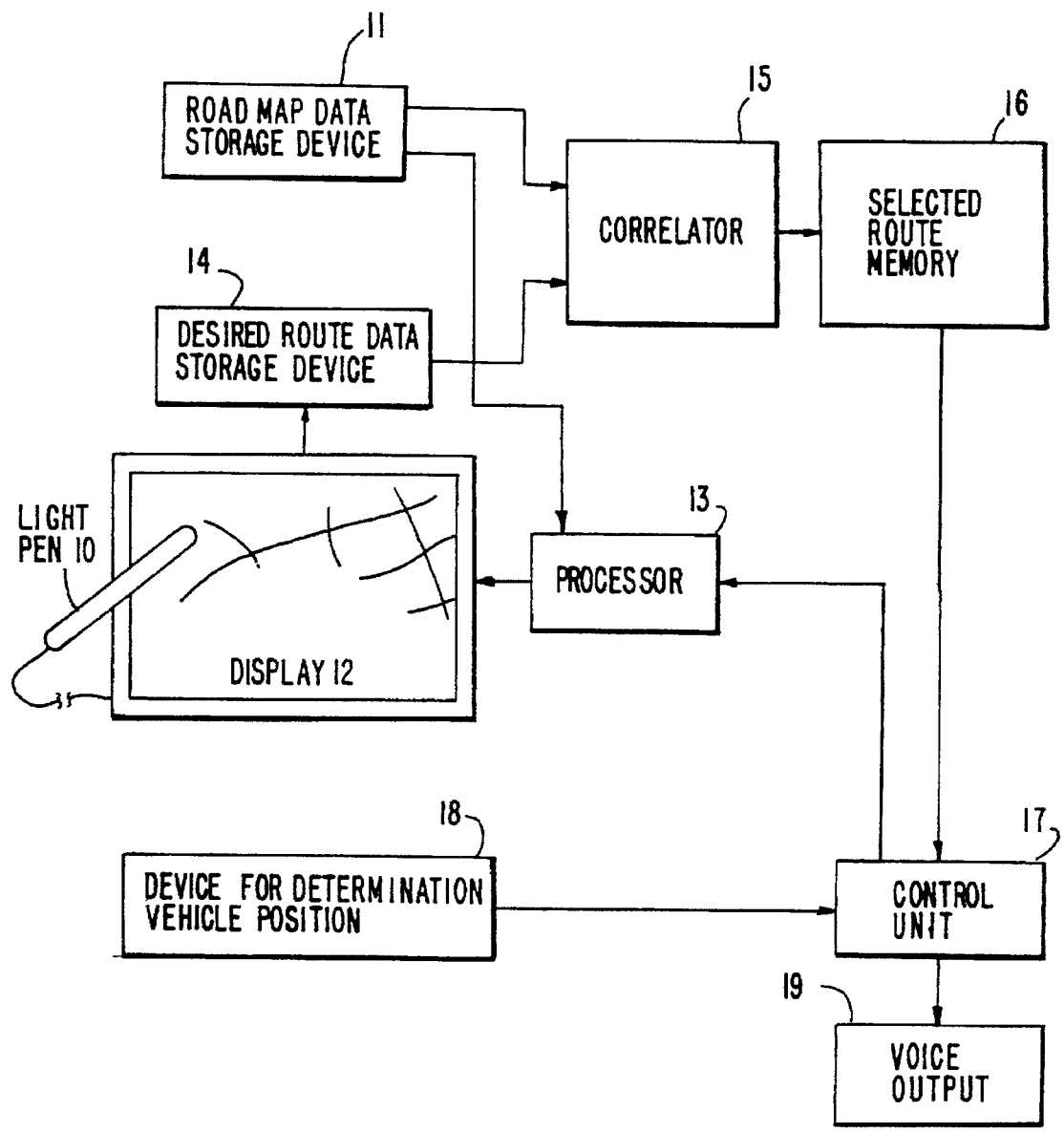
FIG. 1 is a schematic block diagram showing the essential components of a navigation system for land vehicles according to the present invention.
Figure 2A:
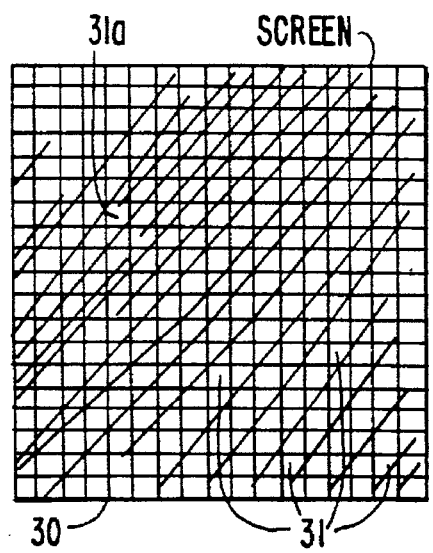
FIGS. 2a and 2b are diagrams illustrating the operation of a light pen with a liquid crystal display.
Figure 2B:
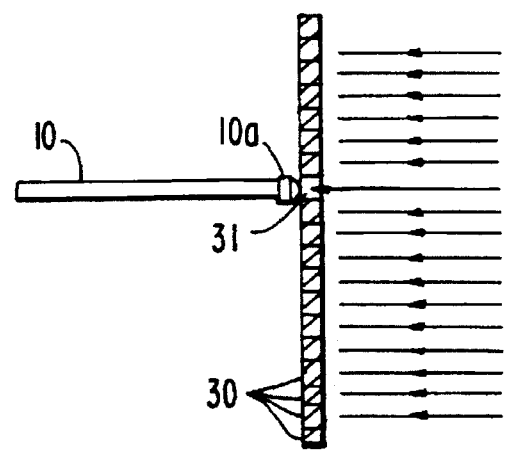

In the embodiments of the invention to be described below, the selected route is input by means of a light pen 10. A map showing the road network through which a journey is to be made is stored in a road map storage device 11. The data may, for example, be permanently stored on a magnetic cassette, and loaded into the system when required. The stored data is fed to a display 12 via processor 13 and presented on the viewing screen of the display. The display may comprise a cathode ray tube. The use of a cathode ray tube in combination with a light pen is well known in the art and will not be described further herein. Alternatively the display may be a graphics capable liquid crystal dispay (LCD) with back lighting, as illustrated in FIGS. 2a and 2b. FIG. 2(a) shows the display diagramatically from the front and FIG. 2(b) the same display from the side.

The screen 30 shown in FIG. 2 is divided into a number of pixels 31 which may be switched from a light impermeable state to a light permeable state. At any moment in time only one of the pixels e.g.: 31a is in the light-permeable state. All of the pixels are illustrated from the back. The light pen has a light detector 10a connected to appropriate circuitry for detecting light emitted from the screen, whereby the position of the pen can be determined by scanning the pixels.

To enable a user to input a desired route the map is displayed on the screen and the route is input using the light pen 10. In the case of an LCD as described above the scanning of the screen to determine the pen position may alternate with the display of the map. The scanning may be so rapid that it would be imperceptible to the eye.

The information on the input route, input via the light pen is fed to an desired route data storage device 14. The input desired route data is compared to the stored available route data by a correlator 15. The correlator is used to solve problems of incidental parallax errors etc. which mean that the traced routes do not agree with the data in storage device 11. The correlator compares the actual input route data with the stored road map data in the storage device 11 and selects from the storage device 11 the route which corresponds most closely to the desired route data. The data selected is then retained in a selected route memory 16 from where it is supplied to a control unit 17. The control unit supplies signals to the processor 13 to cause the selected route, based on data from the storage device 11 to be illustrated on the viewing screen of the display 12.

During a journey the actual position of the vehicle is monitored and data identifying the vehicle position is supplied to the control unit. The means 18 for calculating the vehicle position includes angle sensors and sensors on the vehicle wheels and is well known in this art. Any known method for calculating the vehicle position using the sensors may be used and the precise details will not be described further herein. The position data is supplied to the processor 13 via the control unit 17 and the actual position is displayed on the screen. With the selected route and the present position being indicated, the driver can tell from a glance at the screen which road he should follow. Arrows may be provided on the display to highlight the actual vehicle position and the direction to be followed. However, it is clearly undesirable for the driver to have to look at the screen while driving and therefore the system of the present invention preferably includes means for giving commands to the driver in synthesized speech, indicated as voice output 19.

Thus, at the same time as controlling the processor to display "present position" data on the screen the control unit controls the voice output to give commands to the driver such as "Turn right at next junction".

The system may include a correlator for correlating position data provided from the sensors with the stored road network data. This compensates to some extent for inaccuracies in the sensing and calculating of the actual vehicle position. The correlator 15 may perform this function as well as correlating the input route data with the stored road network data.

Figure 3A:
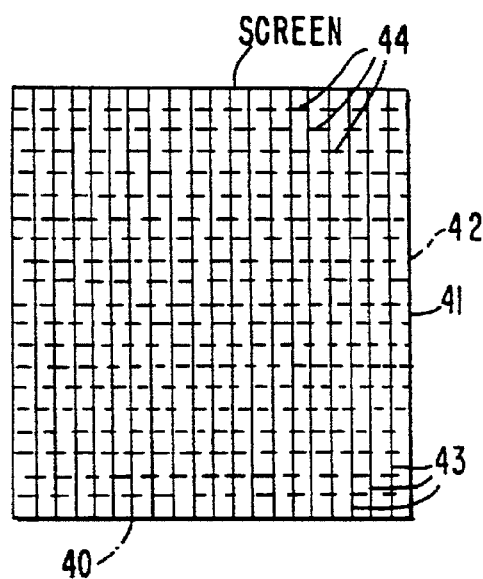
FIGS. 3a and 3b are diagrams illustrating the operation of a digitizing mesh system.
Figure 3B:
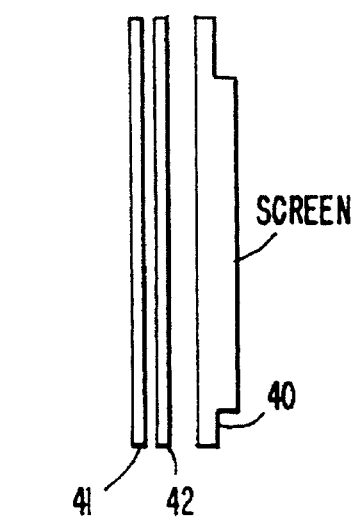

As mentioned above, instead of using a light pen to trace the route the known digitizing mesh system may be used. This is illustrated schematically in FIGS. 3a and 3b. FIG. 3(a) is a diagrammatic front elevational view and FIG. 3(b) is a corresponding side elevation. In this arrangement two membranes 41, 42 overlie the front of an LCD screen 40. Each membrane is transparent and carries a series of transparent conductive tracks. Membrane 41 carries vertical tracks 43 and membrane 42 carries horizontal tracks 44. The membranes are not normally in contact. The LCD displays the map and an ordinary pen or pencil or any other suitable pointed implement may be used to trace the route on the display. As the pen travels across the screen the two membranes and their associated conductive tracks make contact (point wise under the pen). By applying successive voltages to, for example, the horizontal tracks 44 and interrogating the vertical tracks for voltage, the location of the pen and hence the desired journey route can be determined.

Another alternative arrangement for inputting the desired route is to provide a cursor on the display which may be moved by means of a joystick or "mouse" as it well known in the art.

At least a portion of the comparison means referred to in the claims below is included in the control unit 17 in the preferred embodiment above.

While the invention has been illustrated and described as embodied in a vehicle navigation system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Vehicle navigation system for a vehicle operable by an operator, comprising:

means for storing data representing a road map including roads and junctions of said roads over which said vehicle can travel and a plurality of available routes over said roads;

means for processing and at least partly displaying said data representing said road map, said means for processing and displaying being connected to said means for storing;

manually operable means for following said data displayed on said means for processing and displaying so as to select a desired route for travel of said vehicle, wherein said desired route is not necessarily one of said available routes;

input means for storing said desired route selected by operation of said manually operable means;

correlation means for comparing said desired route stored in said input means with said available routes in said means for storing data to find a selected route of said available routes closest to said desired route;

memory means for storing said selected route connected to said correlation means; and control means connected to said memory means for displaying said selected route.

2. Vehicle navigation system as defined in claim 1, further comprising means for generating synthesized speech connected with said control means for giving direction commands to said operator of said vehicle.

3. Vehicle navigation system as defined in claim 1, wherein said control means includes means for giving visual direction commands to said operator of said vehicle, and wherein said means for processing and for at least partly displaying displays an actual position of said vehicle.

4. Vehicle navigation system as defined in claim 3, wherein said means for processing and at least partly displaying includes a liquid crystal display having a screen and said manually operable means comprises a light sensitive device operable to trace a desired route on said screen.

5. Vehicle navigation system as defined in claim 3, wherein said means for processing and at least partly displaying includes a cathode ray tube including a screen and said manually operable means comprises a light sensitive device operable to trace a desired route on said screen.

6. Vehicle navigation system as claimed in claim 3, wherein said means for processing and at least partly displaying includes a cursor moveable by said manually operable means to trace said desired route on said means for processing and at least partly displaying.

* * * * *